(12) United States Patent
Charbonneau et al.

(10) Patent No.: US 8,561,549 B2
(45) Date of Patent: Oct. 22, 2013

(54) RAMP FOR EVACUATION DEVICE

(75) Inventors: Mathieu Charbonneau, Montreal (CA); Olivier Leclerc, Saint-Charles-de-Drummund (CA); Jean-Bernard Landry, Montreal (CA)

(73) Assignee: Bombardier Transportation (DE)

( * ) Notice: Subject to any disclaimer, the term of this patent is extended or adjusted under 35 U.S.C. 154(b) by 186 days.

(21) Appl. No.: 13/140,986

(22) PCT Filed: Dec. 18, 2008

(86) PCT No.: PCT/CA2008/002220
§ 371 (c)(1),
(2), (4) Date: Oct. 7, 2011

(87) PCT Pub. No.: WO2010/069032
PCT Pub. Date: Jun. 24, 2010

(65) Prior Publication Data
US 2012/0279417 A1 Nov. 8, 2012

(51) Int. Cl.
*B60N 5/00* (2006.01)
*B61D 19/00* (2006.01)
*E04G 27/00* (2006.01)

(52) U.S. Cl.
USPC .......... 105/348; 14/69.5; 14/71.3; 244/118.3; 296/61; 414/537

(58) Field of Classification Search
USPC ......... 105/348, 426, 427, 428, 429, 437, 443, 105/447, 448; 414/921, 537; 244/118.3; 14/69.5, 71.3; 296/61
See application file for complete search history.

(56) References Cited

U.S. PATENT DOCUMENTS

| | | | |
|---|---|---|---|
| 2,531,263 A | 11/1950 | Fink et al. |
| 2,541,288 A | 2/1951 | Rice |
| 2,933,149 A | 4/1960 | Lee |
| 3,047,093 A | 7/1962 | Cruz |
| 3,083,784 A | 4/1963 | Urian |

(Continued)

FOREIGN PATENT DOCUMENTS

| AU | 2006100845 A4 | 11/2006 |
|---|---|---|
| CA | 2509109 C | 1/2008 |

(Continued)

OTHER PUBLICATIONS

Examination Report/Search Report; Application No. 20110449-4, Filing date Dec. 18, 2008; Date of mailing Sep. 6, 2012.

(Continued)

*Primary Examiner* — Mark Le
(74) *Attorney, Agent, or Firm* — Cantor Colburn LLP

(57) ABSTRACT

A foldable ramp for evacuation of a vehicle, the ramp including hingedly connected primary and secondary side members, a primary fixed panel fixedly attached the primary side members, a primary flipping panel extending between the primary side members adjacent the primary fixed panel and having a first end pivotally connected to the primary side members and a second end free from the side members, and a secondary flipping panel extending between the secondary side members and having a first end free from the side members and hingedly connected to the second end of the primary flipping panel and a second end pivotally connected to the secondary side members. The ramp is configurable between a folded and a deployed position, with the panels in the deployed position forming a ramp surface and the panels in the folded position being stacked one against the other.

17 Claims, 19 Drawing Sheets

(56) References Cited

U.S. PATENT DOCUMENTS

| | | | |
|---|---|---|---|
| 3,449,864 A | | 6/1969 | Prost-Dame et al. |
| 3,478,904 A | | 11/1969 | Courter |
| 3,554,320 A | | 1/1971 | Eggert, Jr. |
| 3,745,707 A | | 7/1973 | Herr |
| 4,014,486 A | | 3/1977 | Nelson et al. |
| 4,068,770 A | * | 1/1978 | Boehringer .................. 414/537 |
| 4,176,812 A | | 12/1979 | Baker |
| 4,216,725 A | | 8/1980 | Hallam |
| 4,615,275 A | | 10/1986 | Ishizuka |
| 4,669,574 A | | 6/1987 | Moutot |
| D291,137 S | | 7/1987 | Malara |
| 4,879,843 A | | 11/1989 | Hamamoto et al. |
| 5,062,174 A | * | 11/1991 | DaSalvo ........................ 14/69.5 |
| 5,154,125 A | | 10/1992 | Renner et al. |
| 5,312,148 A | * | 5/1994 | Morgan .......................... 296/61 |
| 5,697,754 A | * | 12/1997 | Raymer ........................ 414/537 |
| 5,791,717 A | * | 8/1998 | Reich et al. ..................... 296/61 |
| 6,179,545 B1 | | 1/2001 | Petersen, Jr. et al. |
| 6,343,908 B1 | | 2/2002 | Oudsten et al. |
| 6,698,998 B2 | * | 3/2004 | Koretsky ....................... 414/537 |
| 6,981,572 B2 | | 1/2006 | Hedley |
| 7,870,631 B2 | * | 1/2011 | Morris et al. .................. 14/71.3 |
| 2005/0123385 A1 | * | 6/2005 | Kirsch .......................... 414/573 |
| 2006/0104773 A1 | * | 5/2006 | Koretsky et al. ............. 414/537 |
| 2007/0183879 A1 | | 8/2007 | Corcuera |

FOREIGN PATENT DOCUMENTS

| | | |
|---|---|---|
| CA | 2543576 C | 5/2011 |
| CN | 2897754 Y | 5/2007 |
| EP | 0776808 A1 | 6/1997 |
| EP | 1149750 A2 | 10/2001 |
| EP | 1686032 A1 | 8/2006 |
| ES | 2133093 B1 | 8/1999 |
| KR | 100793735 B1 | 1/2008 |
| WO | 2005/058666 A1 | 6/2005 |

OTHER PUBLICATIONS

International Search Report issued Aug. 31, 2009 by Canadian Intellectual Property Office re: PCT/CA2008/002220 citing; US 3,449,864 A, EP 1,686,032 A1, US 6,179,545 B1, US 6,343,908 B1, US 3,745,707 A.

Written Opinion issued Aug. 31, 2009 by Candian Intellectual Property Office re: PCT/CA2008/002220.

Chinese Office action for corresponding application 200880132686.2 filed Dec. 18, 2008; Mail date Feb. 4, 2013.

European Search Report EP 08 87 8829; Dated May 8, 2012 citing the following references EP1686032; EP0776808; EP1149750.

* cited by examiner

FIG_8

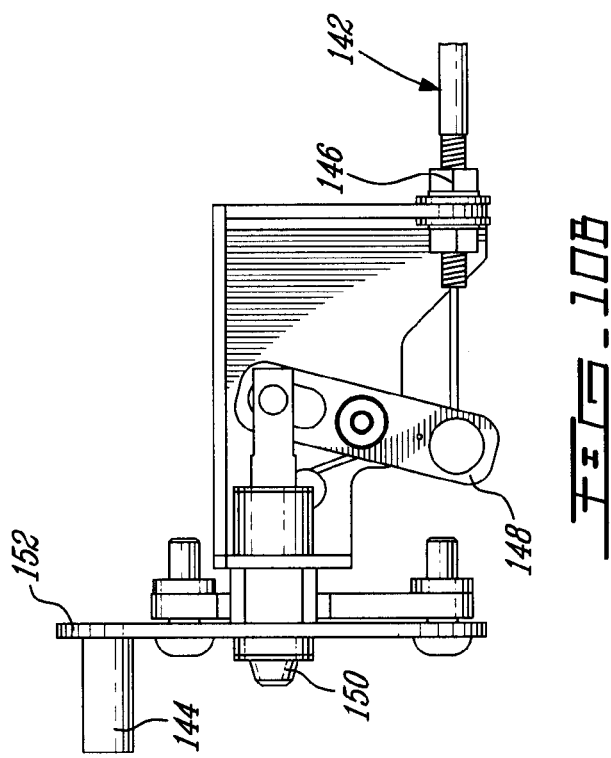
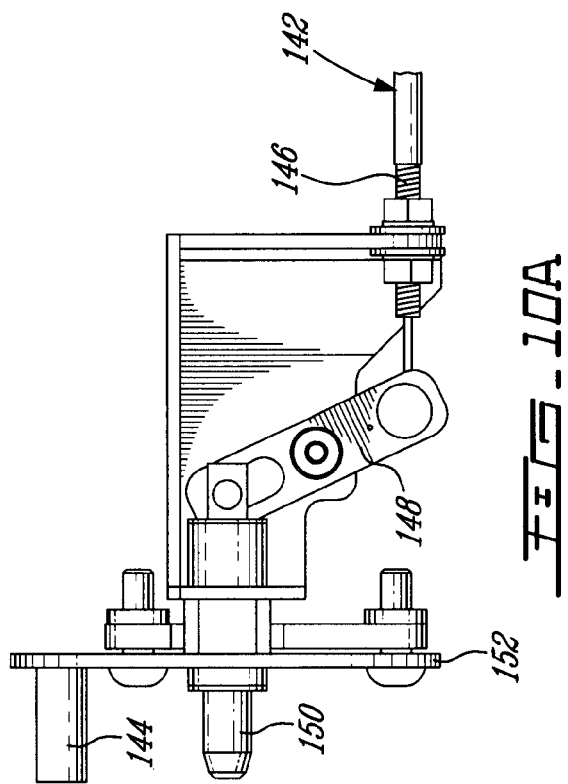

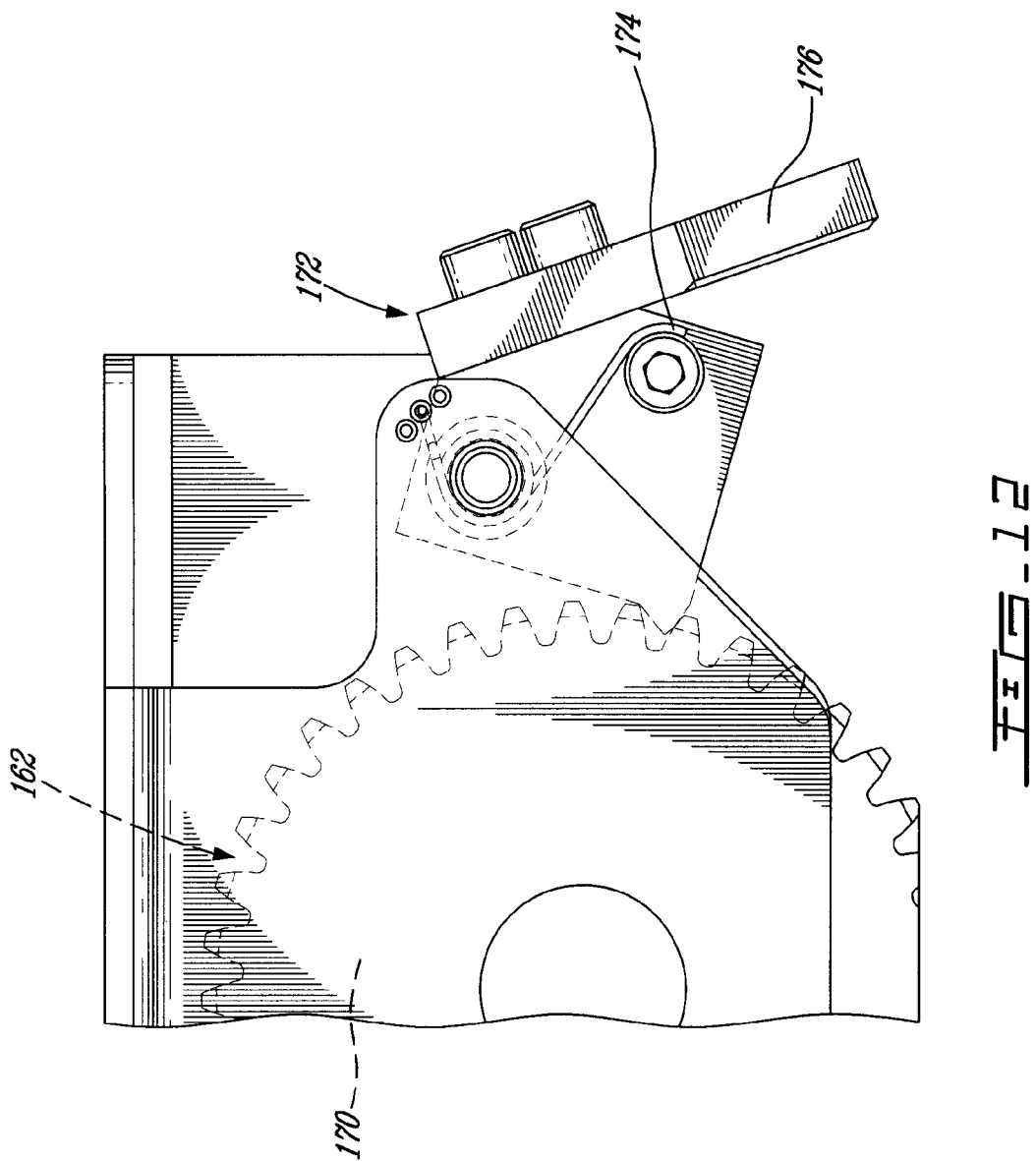

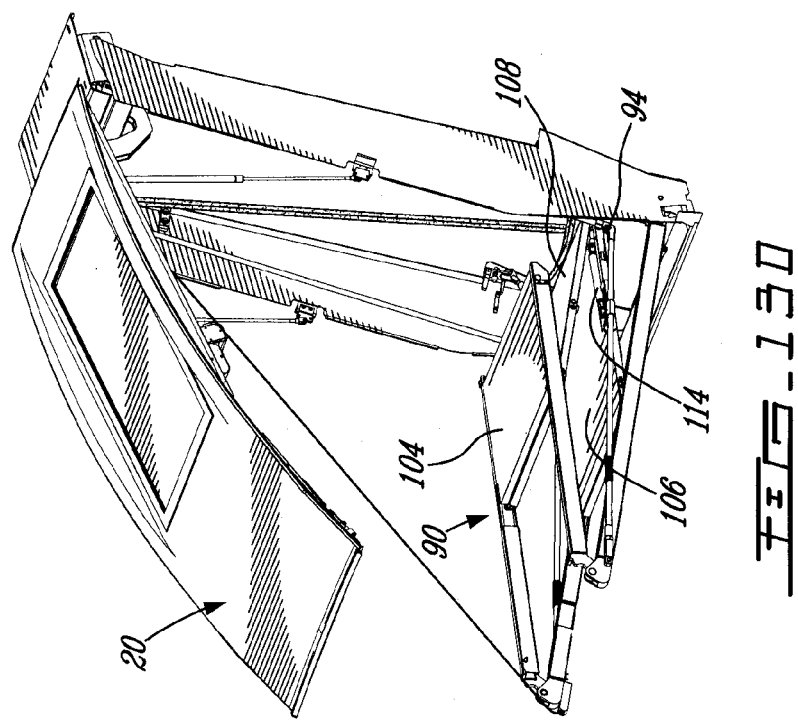
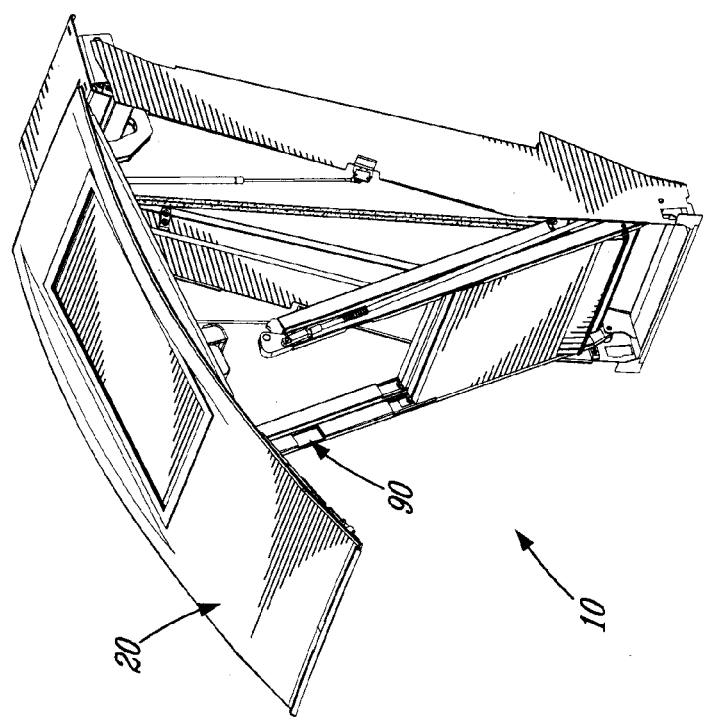

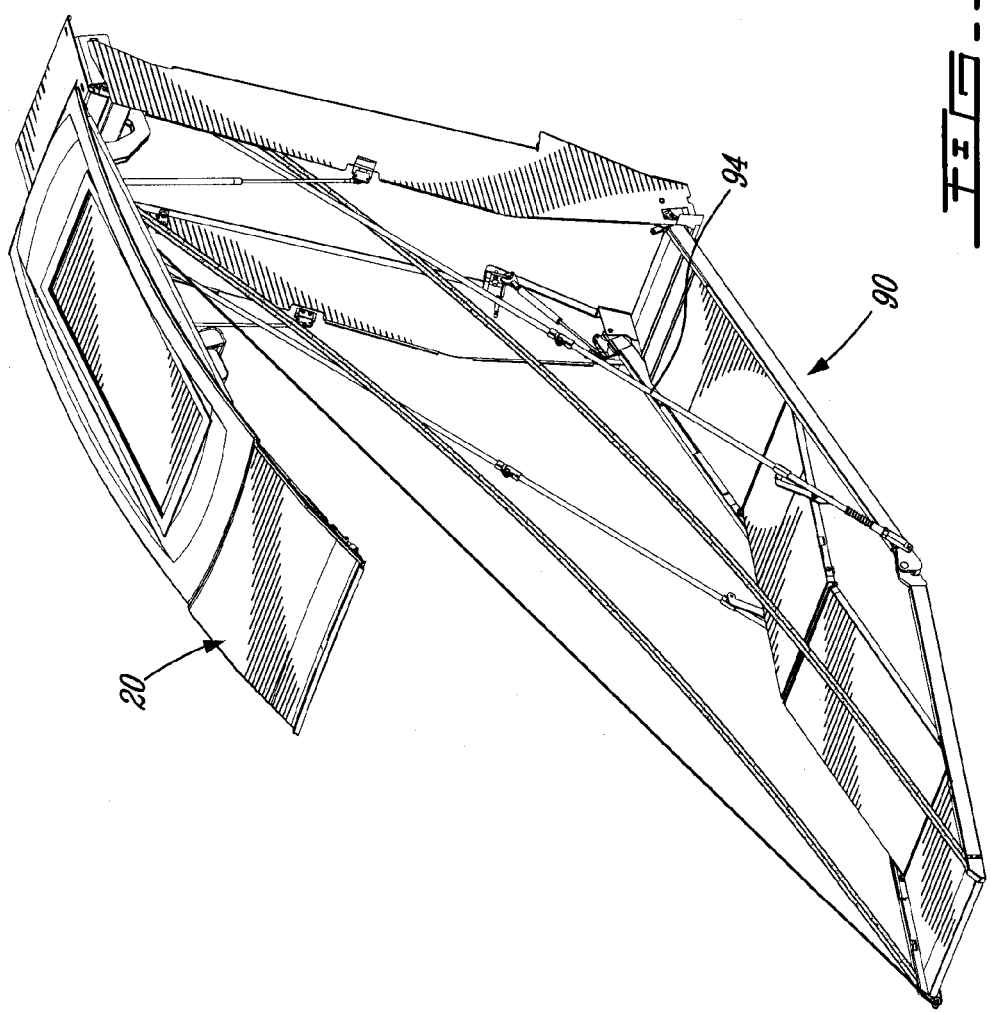

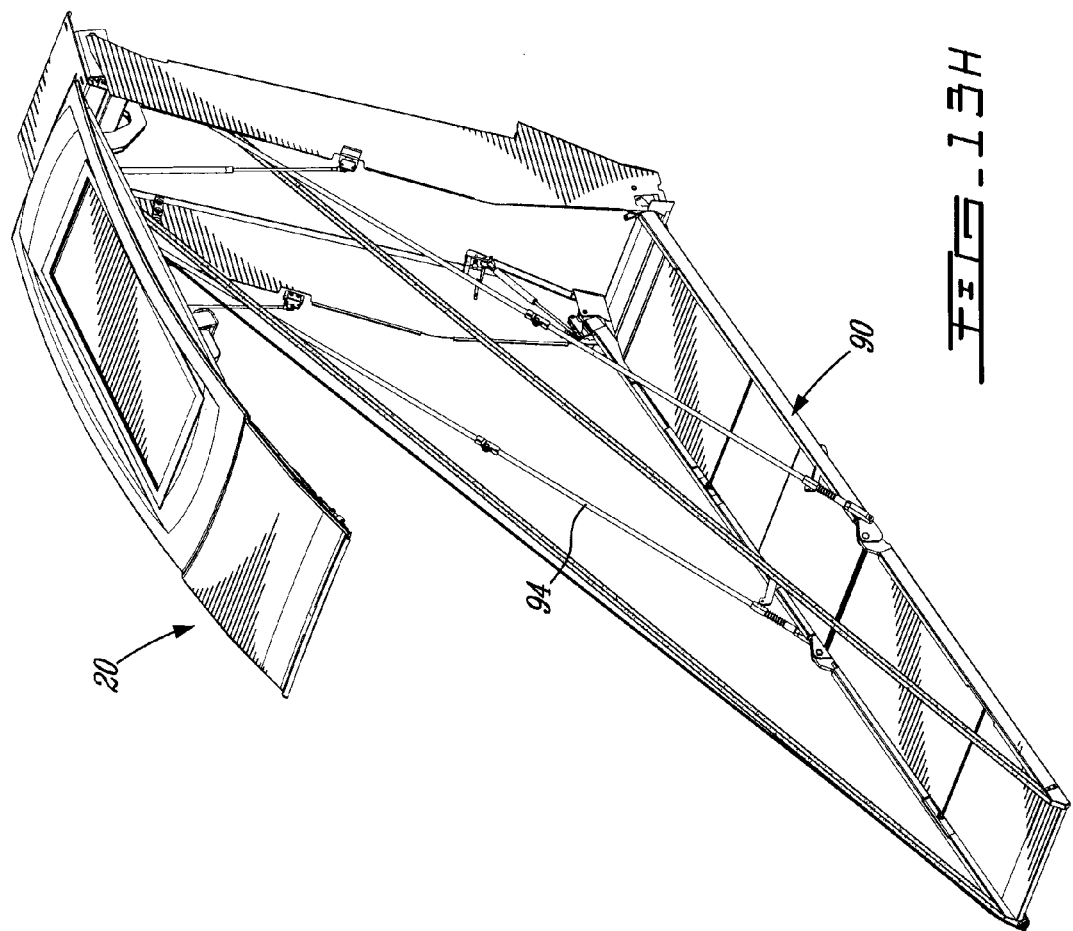

RAMP FOR EVACUATION DEVICE

FIELD OF THE INVENTION

The present invention relates to an evacuation device for vehicles, and more particularly to a ramp for such an evacuation device.

BACKGROUND ART

In passenger ground vehicles such as trains, it is known to provide an emergency evacuation ramp which can be easily actuated by passengers in case of emergency to exit the vehicle quickly. Such ramps are sometimes integrated with an emergency door of the vehicle to automatically deploy when the door is opened. However, emergency ramps integrated with doors often either block a space where a window of the door would otherwise be provided, and as such reduce the vision area of the operator and/or the passengers, may have a relatively complex deployment motion that increases the probability of malfunction during deployment, and/or necessitate a relatively complex manufacturing and installation process.

SUMMARY OF INVENTION

It is therefore an aim of the present invention to provide an improved ramp for an evacuation device.

Therefore, in accordance with the present invention, there is provided a foldable ramp for evacuation of a vehicle, the ramp comprising two spaced apart primary side members each having a first end hingedly connectable to a frame attached to the vehicle and a second end opposed the first end, two secondary side members, each of the secondary side members having opposed first and second ends, the second end of each secondary side member being connected to the second end of a respective one of the primary side members, a primary flipping panel extending between the primary side members and having a first end pivotally connected to the primary side members and a second end free from the side members, a secondary flipping panel extending between the secondary side members and having a first end pivotally connected to the secondary side members and a second end free from the side members, the second end of the secondary flipping panel being hingedly connected to the second end of the primary flipping panel, and a fixed panel extending between one of the primary side members and the secondary side members, the fixed panel being fixedly attached to the one of the primary and secondary side members adjacent the first ends thereof, the fixed panel being adjacent the first end of the flipping panel connected to the one of the primary and secondary side members, wherein the ramp is configurable between a folded and a deployed position, the panels in the deployed position forming a ramp surface for evacuation of the vehicle, and the panels in the folded position being stacked one against the other.

Also in accordance with the present invention, there is provided an evacuation device for a ground vehicle, the evacuation device comprising such a ramp, the frame defining a door opening, a door connected to the frame through hinges such as to be pivotable between a closed position where the door blocks the door opening and an opened position where a free end of the door is pivoted away from the vehicle, the ramp in the folded position allowing the door to close thereover.

Also in accordance with the present invention, there is provided a door assembly for an evacuation device of a ground vehicle, the door assembly comprising a door, a locking mechanism including a rotating cam and lock rods extending therefrom to actuate a latch selectively locking and unlocking the door with a corresponding frame, and an inflatable seal extending around the door and sealing a space between the door and the frame when the door is a closed position, the inflatable seal being connected to a source of pressurized air through a valve, the locking mechanism in a locked position being actuated toward an unlocked position through rotation of the cam, the rotating cam actuating the valve before actuating the latch, the valve upon actuation releasing air pressure in the inflatable seal.

Further in accordance with the present invention, there is provided an evacuation device for a ground vehicle, the device comprising a frame module defining a door opening, a door connected to the frame module through hinges such as to be pivotable between a closed position where the door blocks the door opening and an opened position where a free end of the door is pivoted away from the vehicle, a deployable ramp pivotally connected to the frame module adjacent a threshold thereof, the ramp being movable between a retracted and a deployed position, and biased to be deployed when in the retracted position, a drum rotationally mounted in a fixed position with respect to the frame module, the drum being engaged with a rope wound therearound and attached to the ramp, the rope retaining the ramp in the retracted position when the drum is prevented from rotating, a gear functionally connected to the drum such as to rotate therewith, a ratchet mechanism biased to engage the gear, the ratchet mechanism being movable between an engaged position in engagement with the gear, and a release position free of the gear, the ratchet mechanism in engagement with the gear preventing the drum from rotating in a direction corresponding to the ramp being deployed while allowing the drum to rotate in the opposite direction, and a latch mechanism attached to the door or to an element moving with the door, the latch mechanism being in engagement with the ratchet mechanism such that an opening motion of the door moves the latch mechanism which moves the ratchet mechanism away from the engaged position, the latch mechanism moving the ratchet mechanism to the release position when the door has reached a given position away from the closed position.

BRIEF DESCRIPTION OF THE DRAWINGS

Reference will now be made to the accompanying drawings, showing by way of illustration a particular embodiment of the present invention and in which:

FIGS. 10A and 10B are side views of part of an exterior release mechanism, shown in an activated position in FIG. 10A and in a standby position in FIG. 10B;

FIG. 12 is a side view of a ratchet mechanism and part of a winch assembly of the header assembly of FIG. 11;

FIGS. 13A-13H are perspective views of the evacuation device of FIG. 1 showing a progression of a deployment of the ramp thereof;

DETAILED DESCRIPTION OF THE PARTICULAR EMBODIMENTS

Figure 1:
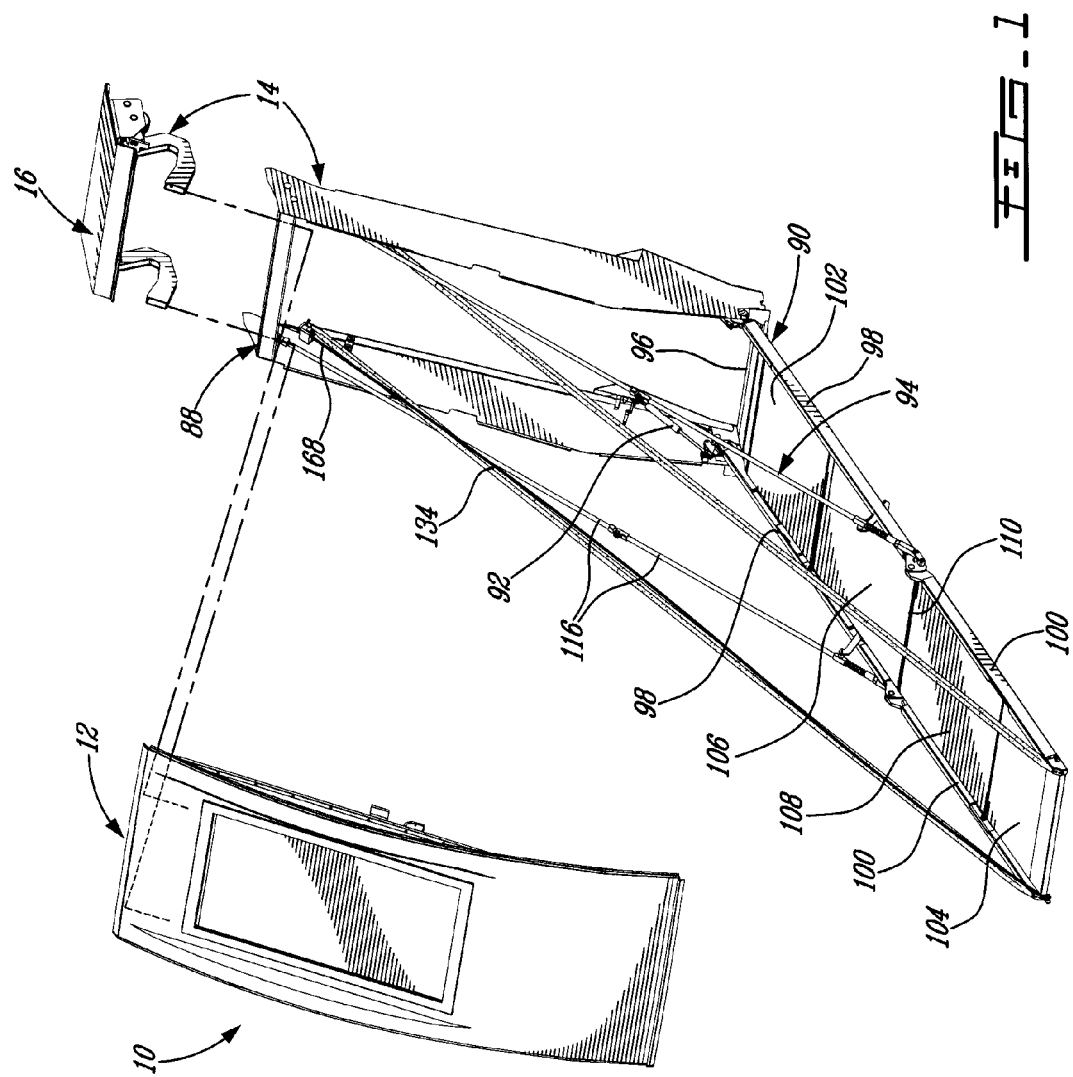
FIG. 1 is an exploded perspective view of an evacuation device according to a particular embodiment of the present invention.
Figure 2:
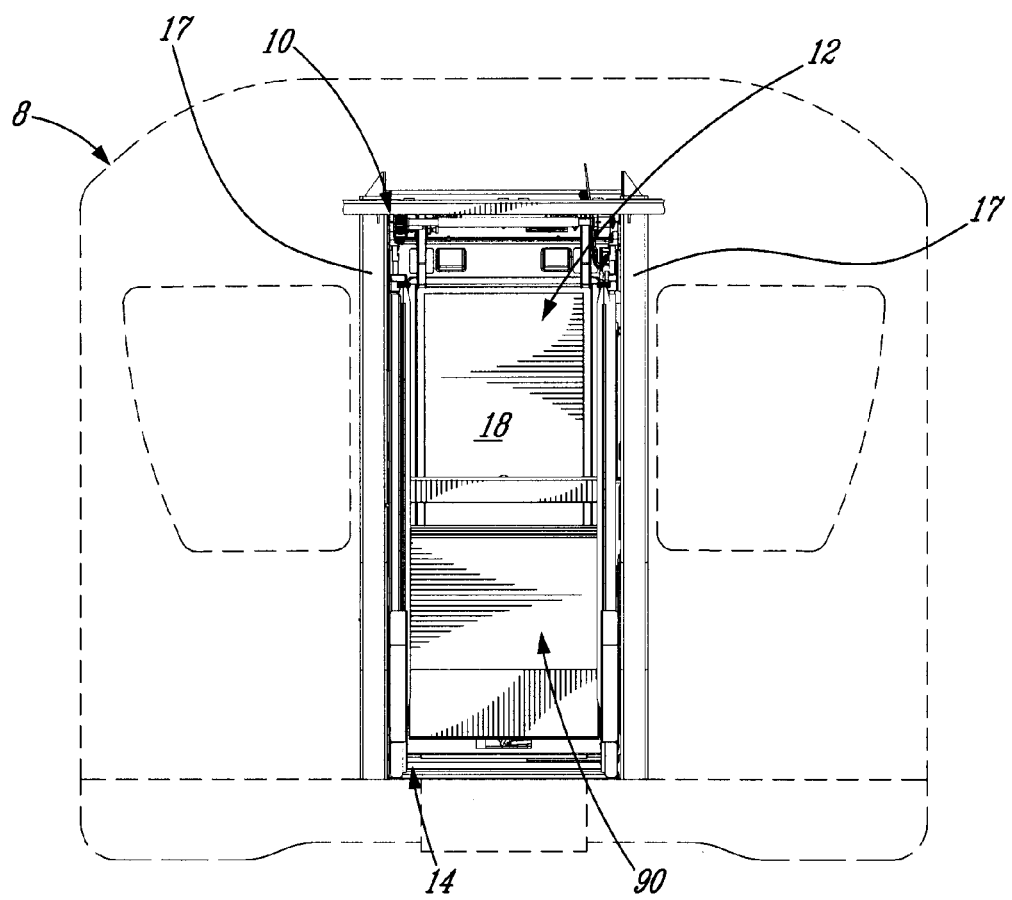
FIG. 2 is an end view of a train cab incorporating the evacuation device of FIG. 1.

Referring now to FIG. 1, an evacuation device according to a particular embodiment of the present invention is generally shown at 10 and comprises a door assembly 12 and a frame and ramp assembly 14 which includes a header assembly 16. In the embodiment shown, the device 10 is designed to be used as an emergency evacuation device and be mounted by a train car builder to a new or existing vehicle at the ends of the front and rear cabs 8, as shown in FIG. 2. The frame and ramp assembly 14 is attached to the frame of the vehicle, for example to vertically extending collision posts 17 thereof extending on each side of the door opening.

The modular configuration advantageously facilitates fabrication, testing and installation of the evacuation device 10. The interior panels of the device 10 are preferably designed to be integrated with the cab interior design.

In order to provide to the vehicle operator a wide vision area, the frame and ramp assembly 14 in its folded position provides for a substantially large opening 22 which overlays at least a major portion of a windshield area 18 of the door assembly 12, such that the windshield area 18 is at least substantially unobstructed by the frame and ramp assembly 14 in its folded position.

Figure 3:
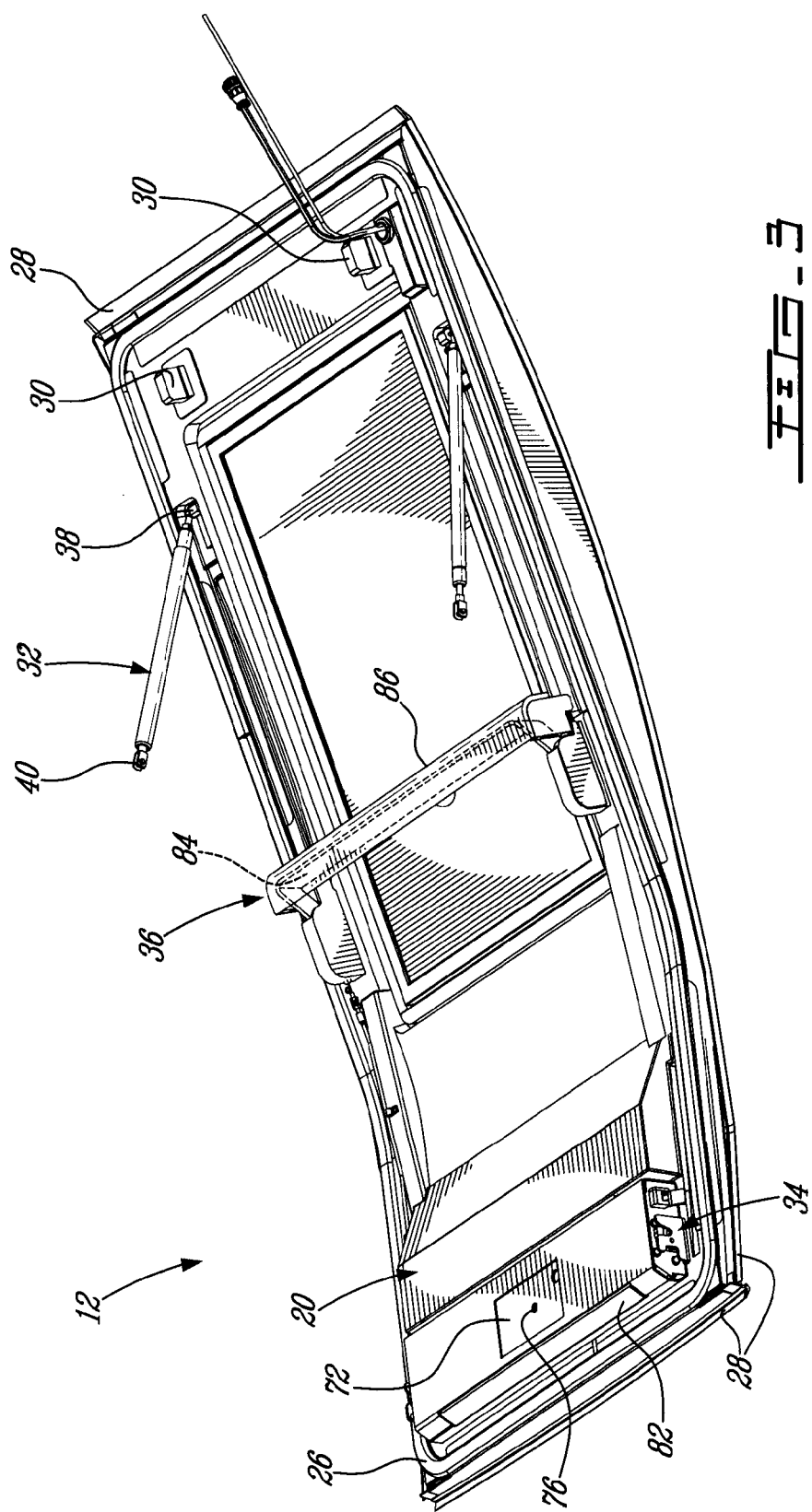
FIG. 3 is a perspective view of a door assembly of the evacuation device of FIG. 1.

Referring to FIG. 3, the door assembly 12 includes a door 20 which is preferably, although not necessarily, molded as a single piece. In a particular embodiment, the door is made of fiberglass and is reinforced with core cells and with pockets to prevent the door from bending under the applied load.

The door assembly 12 also includes an inflatable seal 26 extending around the door 20 and dust barriers 28 mounted to the perimeter of the door 20 to prevent ingress of water, dust and others debris in the gap between the door 20 and outer wall of the cab (not shown). An inner conduit (not shown) extends within the door 20 between a pressurized air source and the inflatable seal 26.

The door assembly 12 further includes hinge fixing blocks 30 for receiving door hinges, gas springs 32, a locking mechanism 34 and an interior release mechanism 36. All of these elements are mounted to the door 20 in an adequate manner, for example each through a respective back plate with studs embedded into the door 20. In a particular embodiment, the hinge fixing blocks 30 are mounted to the door 20 to be adjustable laterally, in order to provide adjustment of the relative position of the door 20.

The gas springs 32 each have a first end 38 pivotally attached to the door 20 and a second end 40 pivotally attached to the vehicle in which the device 10 is installed. The gas springs 32 allow the door 20 to automatically open once unlocked. Preferably, at least one of the gas springs 32 blocks at full extension to maintain the door 20 opened if a loss of gas pressure occurs. Alternately, locking of the door 20 in the opened position can be provided by a separate mechanism, such as for example a mechanism acting on the door hinges to prevent the door 20 from falling back to the closed position once fully opened.

Figure 4:
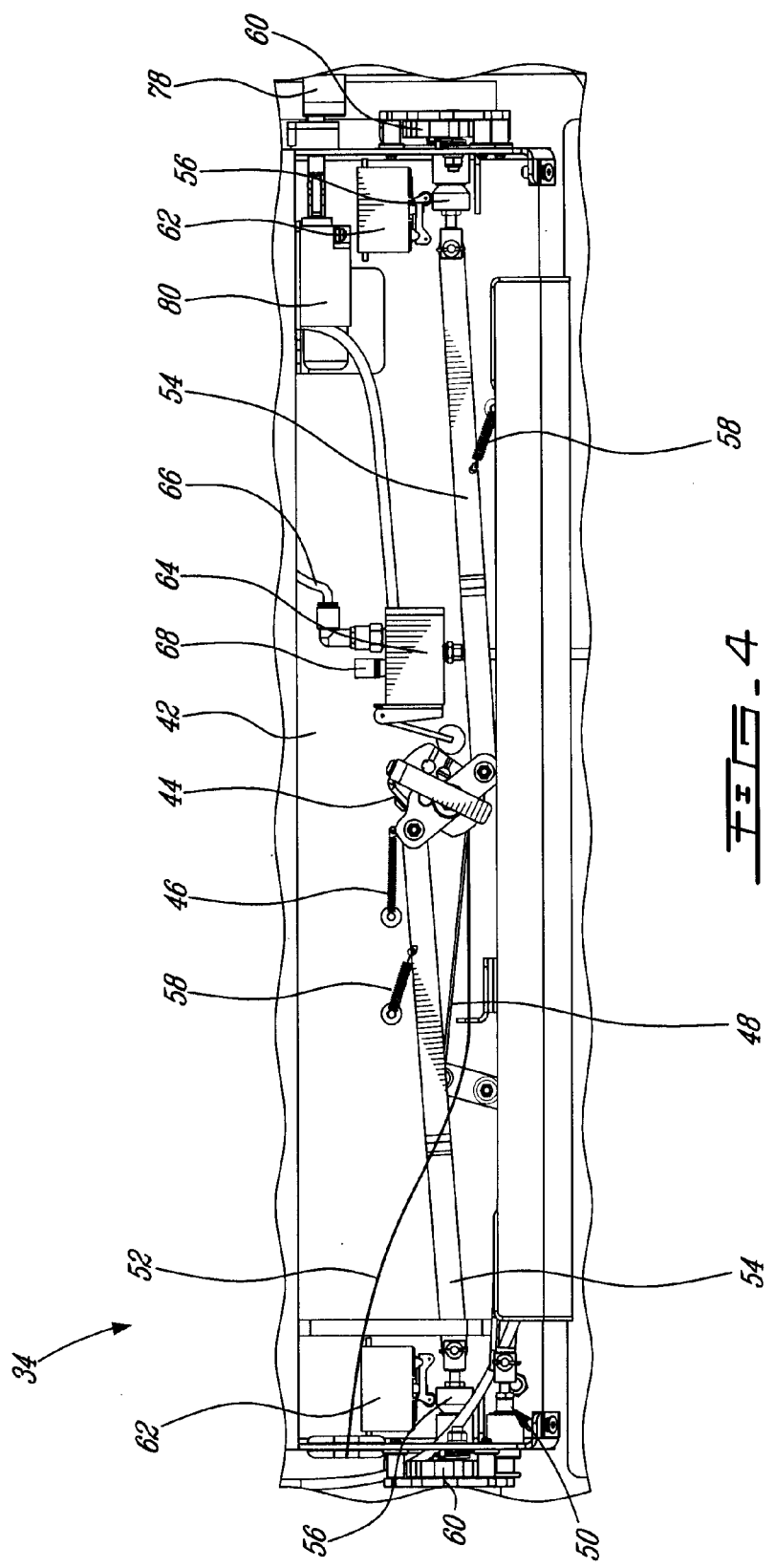
FIG. 4 is a partial cross-sectional view of the door assembly of FIG. 3, showing a locking mechanism thereof.

Referring to FIG. 4, the locking mechanism 34 includes a base plate 42 to which is pivotally mounted a cam 44. The cam 44 interfaces with a return spring 46 and with first and second release cables 48, 52 respectively connected to an exterior lock mechanism 50 actuated by an exterior release mechanism 142 and to the interior release mechanism 36, both of which will be described in more details further below.

The cam 44 pivotally engages two lock rods 54 extending therefrom. Each lock rod 54 has one end pivotally connected to the cam 44 and another end pivotally connected to a latch 56, and is also engaged with a return spring 58. The return springs 46, 58 thus bias the locking mechanism 34 in the engaged position when the door 20 is closed.

Each latch 56 interfaces with a rotatable finger 60 and with a lock switch 62 which sends a signal that is interrupted by the activation of the lock mechanism. Each finger 60 interfaces with a locking pin 144 (see FIGS. 10A-B) mounted on the frame and ramp assembly 14 to produce the locking action.

The cam 44 also interfaces with a pneumatic valve 64 which is connected to the inflatable seal 26 and to an air supply line 66, for example providing air regulated to approximately 10 psi. The valve 64 includes an exhaust port 68.

Figure 5:
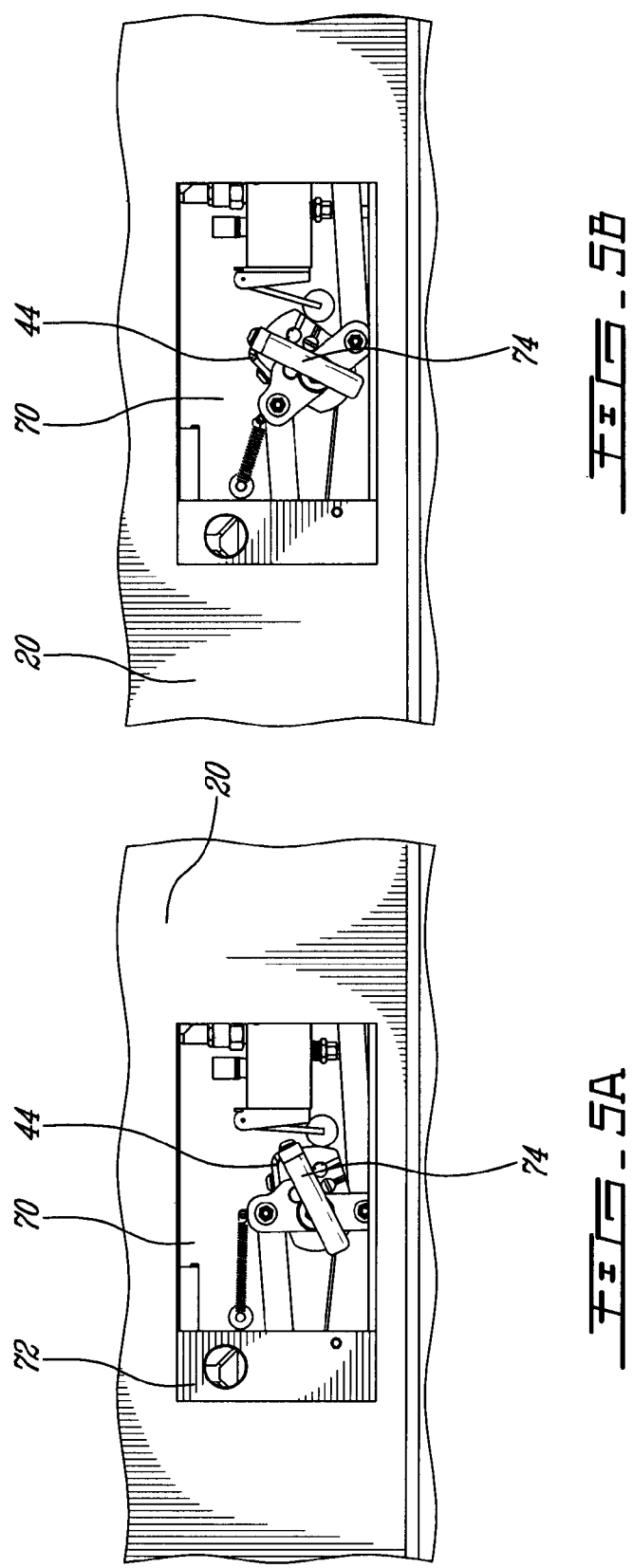
FIGS. 5A and 5B are partial rear view of the door assembly of FIG. 3 is showing part of the locking mechanism of FIG. 4, the locking mechanism being in an unlocked position in FIG. 5A and in a locked position in FIG. 5B.

Referring to FIGS. 5A-5B, the door 20 includes an access opening 70 for accessing the locking mechanism 34 and a slidable access panel 72 closing the access opening. The access panel 72 is preferably locked by a breakable seal as a safety feature. The access opening 70 is defined over the cam 44 which includes a handle 74 that can be used to turn the cam 44 to disengage the locking mechanism if required. In a particular embodiment, the handle 74 is painted in a bright color, for example green, and the access panel 72 includes an opening 76 (see FIG. 3) through which the handle 74 is visible when the locking mechanism 34 is not engaged (as shown in FIG. 5A) and not visible when the locking mechanism 34 is engaged (as shown in FIG. 5B), or the opposite, so that a user can determine by looking at the color visible through the opening 76 whether the locking mechanism 34 is engaged or not.

Thus, upon disengagement of the locking mechanism 34, through actuation of one of the release mechanisms 36, 142 or rotation of the handle 74, the rotation of the cam 44 first activates the pneumatic valve 64 to release the pressure in the inflatable seal 26, such as to ensure an easy unlocking motion. The rotation of the cam 44 then pulls on the lock rods/latches 54, 56 and allows the fingers 60 to rotate. This allows the locking mechanism 34 to be liberated from the locking pins 144 mounted on the frame and ramp assembly 14. The rotation of the cam 44 also activates the lock switch 62 at the same time the door 20 unlocks. The cam 44 also continues acting on the pneumatic valve 64 to maintain the depressurized state of the inflatable seal 26 until the door 20 is closed and locked, to facilitate the close and lock action.

Referring back to FIG. 4, the locking mechanism 34 further includes a close switch cam 78 which interfaces with the frame and ramp assembly 14 and with a close switch 80, with the close switch 80 being activated when the door 20 is opening or closing in order to monitor the status of the door 20.

Referring back to FIG. 3, in a particular embodiment, the door assembly 12 includes a floodlight 82 located along the bottom of the door 20, which is activated by the close switch cam 78 when the door 20 begins its opening motion.

Still referring to FIG. 3, the interior release mechanism 36 includes a release bar 84 installed on the door 20. The interior release mechanism 36 is activated to disengage the locking mechanism 34 simply by pushing on the release bar 84 to pull the second release cable 52 (see FIG. 4) extending through the door 20. Involuntary activation is prevented with an appropriate type of mechanism, for example a pivotable cover 86 that needs to be pivoted upward before the release bar 84 can be accessed and depressed. In a particular embodiment, the pivotable cover 86 includes a safety feature to prevent it from falling back to its initial position once pivoted upward. Such a safety feature can include for example flat surfaces on the pivot of the cover 86 allowing the pivot to slide into a machined slot of a bracket once the cover 86 is pivoted upward, together with a biasing mechanism maintaining the pivot in the slot, such as to prevent the cover 86 from pivoting back over the release bar 84.

Referring to FIGS. 10A-B, the frame and ramp assembly 14 includes the exterior release mechanism 142 allowing actuation of the door opening and ramp deployment from outside of the vehicle. The exterior release mechanism 142 includes an exterior release handle (not shown) which in a particular embodiment is mounted in a recess and covered with a frangible cover. The handle is linked to an exterior release cable 146. Once the exterior release cable 146 is pulled through the handle, as shown in FIG. 10A, it activates a spring-loaded release cam 148 to which it is connected, and the release cam 148 pushes a sliding shaft 150 out of a support plate 152 which also supports the locking pin 144 engaging the locking mechanism 34. The sliding shaft 150 pushes on the exterior lock link mechanism 50 (see FIG. 4) to pull the first release cable 48 and rotate the cam 44, thus disengaging the locking mechanism 34 from the locking pin 144 to allow the door 20 to open.

Referring back to FIG. 1, the frame and ramp assembly 14 includes a frame module 88 which is made for example of bended and welded metal sheets. The frame and ramp assembly 14 includes a number of components attached to the frame module 88 such as a ramp 90, dampers 92, 114, ramp linkages 94, the locking pins 144 interfacing with the locking mechanism 34, the exterior release mechanism 142, as well as the header assembly 16, to which is attached the door assembly 12. The frame module 88 thus links the components of the evacuation device 10 once installed in the vehicle. The frame module 88 also defines a ramp threshold 96 which is preferably covered with an anti-slip finish for improved safety.

The ramp 90 includes two primary side members 98 hingedly connected to the frame module 88, and two secondary side members 100 each hingedly connected at the end of a respective one of the primary side members 98.

The ramp 90 also includes primary and secondary fixed ramp panel 102, 104 fixedly attached to the respective pair of side members 98, 100, i.e. attached thereto such as to move integrally therewith. The primary fixed panel 102 extends between the primary side members 98 adjacent the frame module 88 and is attached directly to the primary side members 98, e.g. bolted thereto. The secondary fixed panel 104 extends between the secondary side members 100 adjacent to their free end and is attached directly to the secondary side members 100, e.g. bolted thereto. Alternately, each fixed panel 102, 104 can be provided integrally as a single piece together with the corresponding pair of side members 98, 100, for example by being integrally molded therewith. As such the two fixed panels 102, 104 are spaced apart from one another and define the two extremities of the ramp 90.

The ramp 90 further includes primary and secondary flipping ramp panels 106, 108, which are folded against the fixed panels 102, 104 when the ramp 90 is folded and which unfold when the ramp 90 is deployed. The primary flipping panel 106 extends between the primary side members 98 and has one end pivotally connected thereto adjacent the end of the primary fixed panel 102 and another end free from the side members 98, 100 and provided with a hinged connection 110, such as for example a piano hinge. The secondary flipping panel 108 extends between the secondary side members 100 and has one end pivotally connected thereto adjacent the end of the secondary fixed panel 104, and another end free from the side members 98, 100 and attached to the primary flipping panel 106 through the hinged connection 110. The two flipping panels 106, 108 are thus hingedly interconnected and define the middle section of the ramp 90. In the embodiment shown, the hinged connection 110 between the flipping panels 106, 108 is aligned with a hinged connection between the primary and secondary side members 98, 100, although in an alternate embodiment which is not shown, the two hinged connections are offset from one another.

In one particular embodiment, the pivot connection between the flipping panels 106, 108 and the side members 98, 100 are provided through pins extending from the flipping panels 106, 108 and received in corresponding reinforced bores defined in the side members 98, 100.

Figure 8:
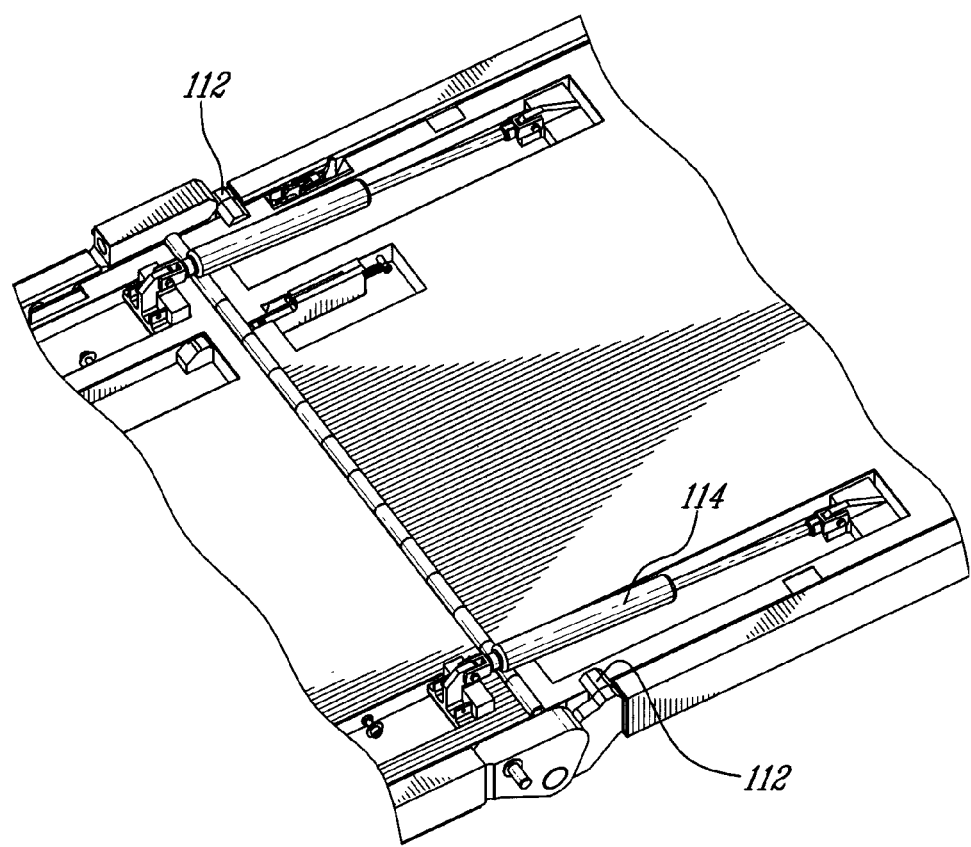
FIG. 8 is a different partial perspective view of the ramp of FIG. 7.

The side members 98, 100 further include stoppers 112 extending therefrom upon which the flipping panels 106, 108 rest when the ramp 90 is deployed (see FIG. 8). The ramp panels 102, 104, 106, 108, once deployed as in FIG. 1, provide a flat and uniform walkway surface to evacuate the vehicle when required. When the ramp 90 is in the folded position as shown in FIG. 9, the panels 102, 104, 106, 108 are pivoted passed the vertical position and are stacked one against the other.

In an alternate embodiment which is not shown, either one the primary or the secondary fixed panels 102, 104 can be omitted, such that one end of the ramp 90 is defined by one of the flipping panels 106, 108.

In a particular embodiment, the side members 98, 100 are made of stainless steel and the panels 102, 104, 106, 108 include a layer of honeycomb type material sandwiched between two skin panels, made for example of anodized aluminum. The edges, the sides and the ends of the ramp 90 are marked, for example in yellow, to guide the passengers through the ramp exit path, and the panels 102, 104, 106, 108 are covered with a slip-resistant finish.

Figure 9:
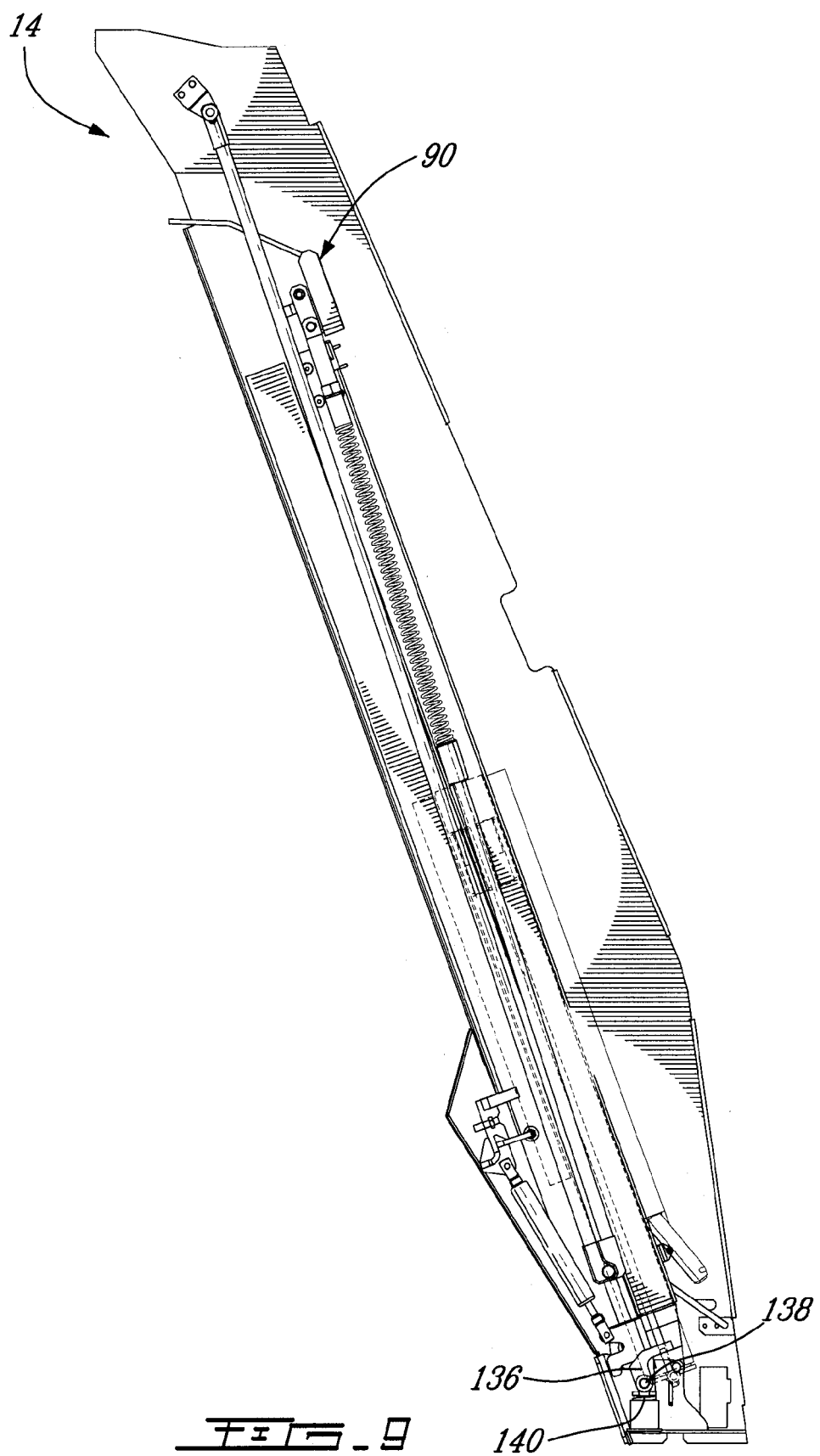
FIG. 9 is a side cross-sectional view of a frame and ramp assembly of the evacuation device of FIG. 1 shown with the ramp in a folded position.

Referring to FIG. 9, the ramp 90 includes spring-loaded arms 136 which are mounted on each side thereof, and which are spring loaded during the ramp folding process. Each arm 136 includes a roller 138 at its end which, when the ramp is folded, engages a spring 140 enclosed in a tube and attached to the frame module 88. As such, the ramp 90 is biased toward the deployed position when folded, and the spring-loaded arms 136 push the ramp 90 over the vertical position during the ramp deployment process, when the ramp 90 is released from the folded position.

The ramp 90 is preferably self-supporting, such that the ramp 90 does not rest upon the ground once deployed. In a particular embodiment applied to a train cab, the ramp 90, once deployed, forms a maximum angle of 20° with the horizontal, and stands approximately 12 inches above the ballast to allow an easy, fast and safe deployment of the ramp 90 in a variation of rail slopes and vehicle suspension conditions, to ensure that the ramp 90 stays over the top of rail and provides, in case of emergency, a safe, planar and straight exit walkway to the passengers.

Dampers, for example oil dampers, provide for a smooth deployment of the ramp 90. Referring to FIG. 1, the frame and ramp assembly 14 includes two primary dampers 92, one of which being attached between the frame module 88 and each primary side member 98 at the hinged connection between the primary side member 98 and the frame module 88. Referring to FIG. 8, the frame and ramp assembly 14 also includes two secondary dampers 114 attached between the primary and secondary flipping panels 106, 108 adjacent the sides thereof, which damp the deployment of the secondary portion of the ramp 90. The secondary dampers 114 are located under the ramp 90 in the deployed position and are blind when the ramp 90 is in the folded position.

The frame and ramp assembly 14 further includes two ramp linkages 94 supporting the primary portion of the ramp 90. Each linkage 94 includes two (2) pivotally linked rod sections 116, which in a particular embodiment are made of stainless steel. Each linkage 94 extends from the upper part of the frame module 88 to the respective primary side member 98, near the hinged connection between the primary side member 98 and the secondary side member 100. Once the ramp 90 is folded, the linkages 94 fit between the ramp 90 and the frame module 88, as shown in FIG. 9.

Figure 6:
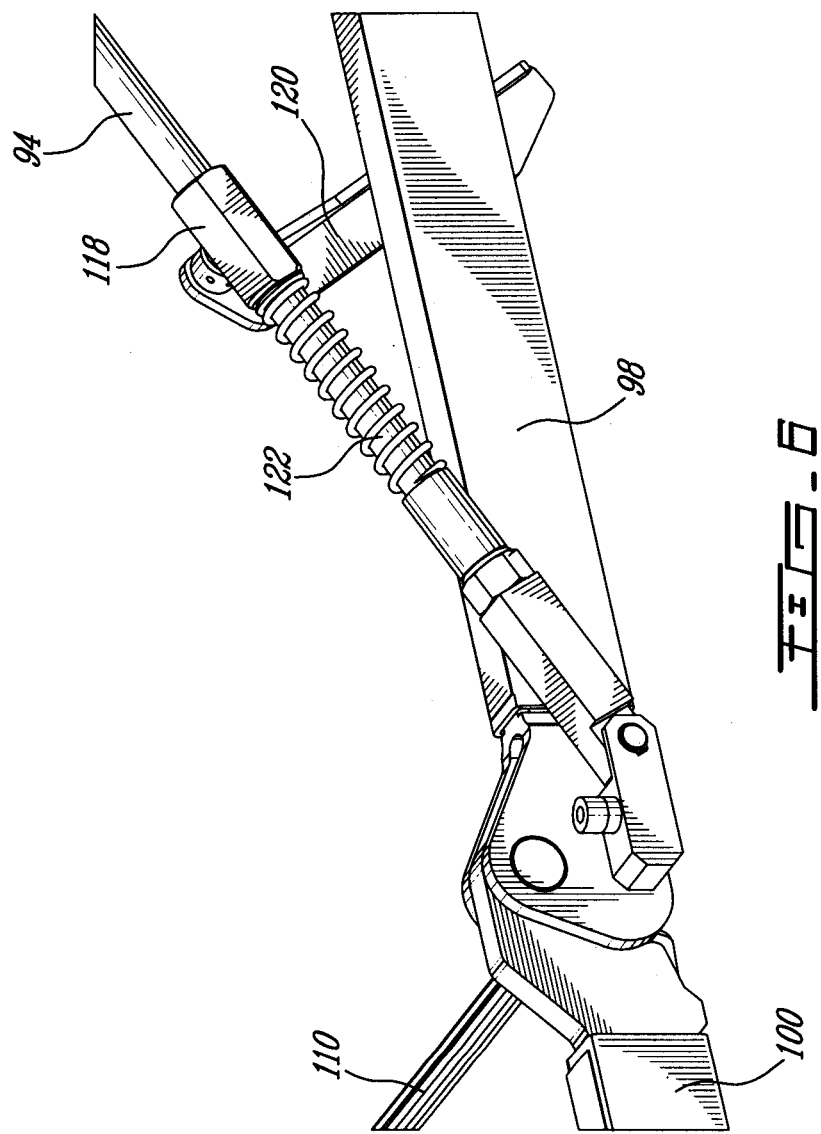
FIG. 6 is a perspective view of part of a ramp of the evacuation device of FIG. 1.

Referring to FIG. 6, each linkage 94 slidably extends through a sleeve 118 pivotally attached to an arm 120, which is pivotally attached to the respective side of the primary flipping panel 106 (see also FIGS. 13E-13F) such that the deploying linkage 94 forces deployment of the primary flipping panel 106 during deployment of the ramp 90. Alternately, the arm 120 can be pivotally and slidably connected to the linkage using any other adequate type of connection, or the arm 120 can be free from the linkage 94 while coming in contact with the linkage 94 and being pushed thereby during deployment of the ramp 90 to force the deployment of the primary flipping panel 106.

Figure 7:
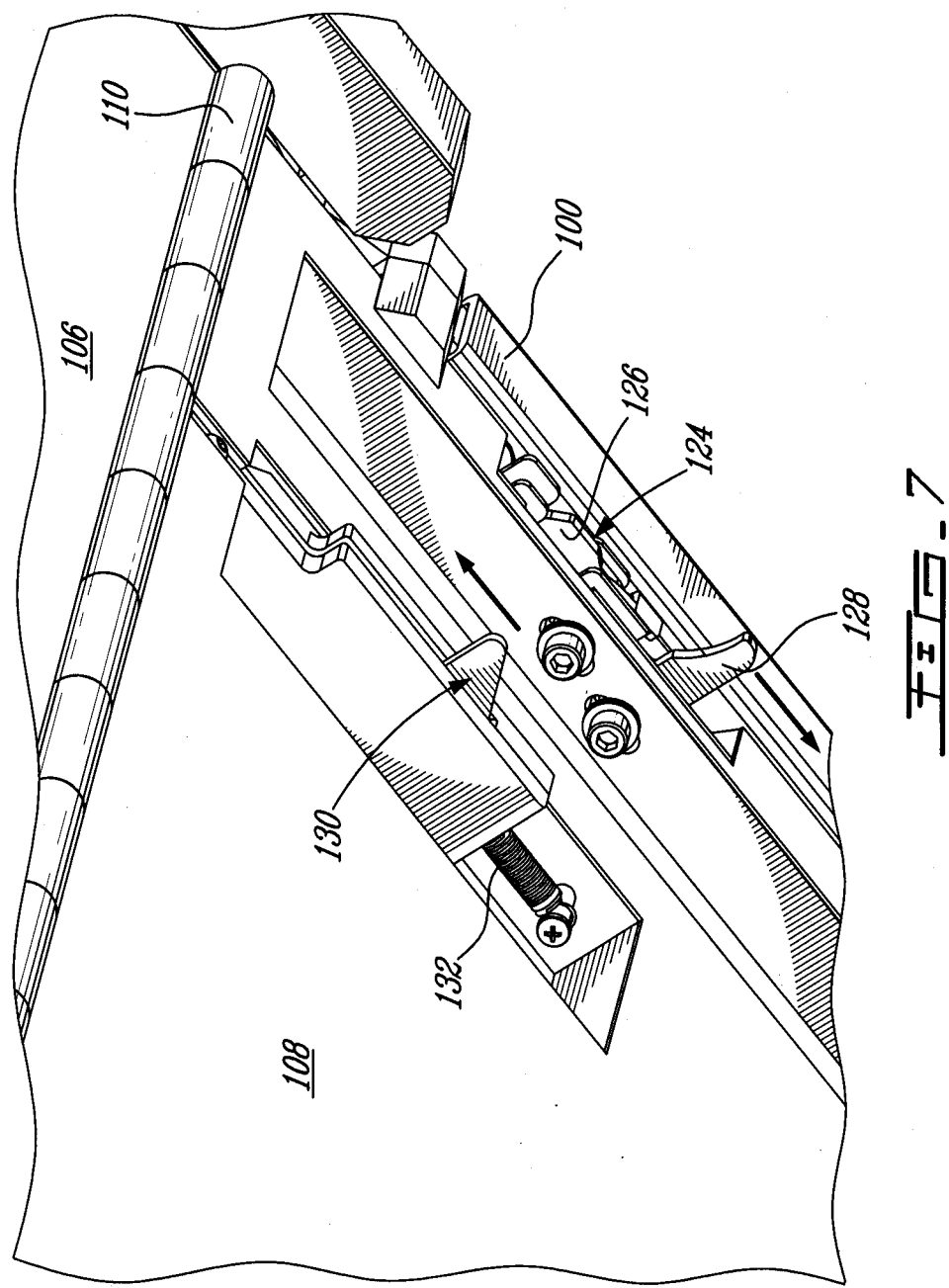
FIG. 7 is a partial perspective view of an underside of a ramp of the evacuation device of FIG. 1.

A compression spring 122 is wound around the linkage 94 between the sleeve 118 and the end of the linkage 94, such as to be compressed as the ramp 90 is deployed. Referring to FIG. 7, the ramp 90 also includes a flipping panel lock 124, including for example a pivotable finger 126 supported on the secondary flipping panel 108 and engaging a pin (not shown) protruding from the adjacent secondary side member 100 when the flipping panels 106, 108 are fully deployed. The ramp 90 under its own weight does not compress the springs 122 enough for the flipping panels 106, 108 to be fully deployed, and as such the flipping panel lock 124 remains disengaged. As the first user walks down the ramp 90, the weight of the user compresses the springs 122 until the flipping panels 106, 108 become fully deployed (i.e. aligned with one another), thus automatically engaging the flipping panel lock 124. At the end of the evacuation process and before the stowing of the ramp 90, the flipping panel lock 124 is manually disengaged by pulling on a lever 128 as indicated by the arrow in the Figure such as to rotate the finger 126 out of engagement with the pin, and the compression springs 122 force the flipping panels 106, 108 out of the fully deployed position.

Figure 14:
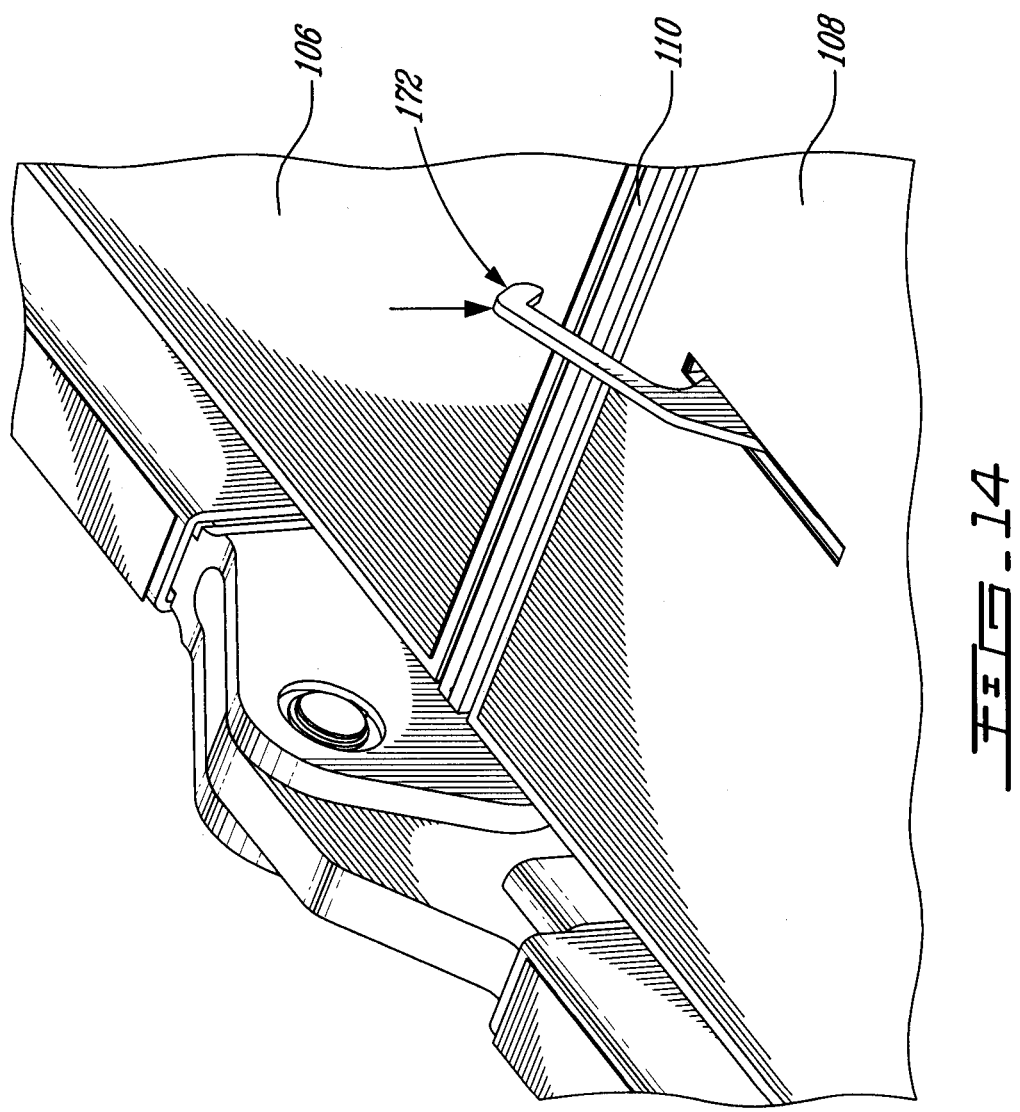
FIG. 14 is a perspective partial view of the ramp of the evacuation device of FIG. 1, showing the engagement of a gripping mechanism therewith prior to retraction of the deployed ramp.

Referring to FIGS. 7 and 14, once the evacuation is over and the flipping panel lock 124 is unlocked, a hook-shaped gripping mechanism 130 is manually engaged in between the members of the hinged connection 110 before the ramp 90 is folded. The gripping mechanism 130 prevents the flipping panels 106, 108 from falling back in the fully deployed and thus locked position during the beginning of the retraction of the ramp 90. As the ramp 90 progressively folds during retraction, the gripping mechanism 130 is automatically disengaged from the hinged connection 110 and is returned to its initial position by a spring 132, such that the ramp 90 is free to be deployed for its next use.

Referring back to FIG. 1, the frame and ramp assembly 14 further includes two belts 134 extending from the frame module 88 and each attached at the free end of a respective one of the secondary side members 100, to act as handrails for the users of the ramp 90. In a particular embodiment, the belts 134 are provided in a bright color, and are preferably reflective.

Figure 11:
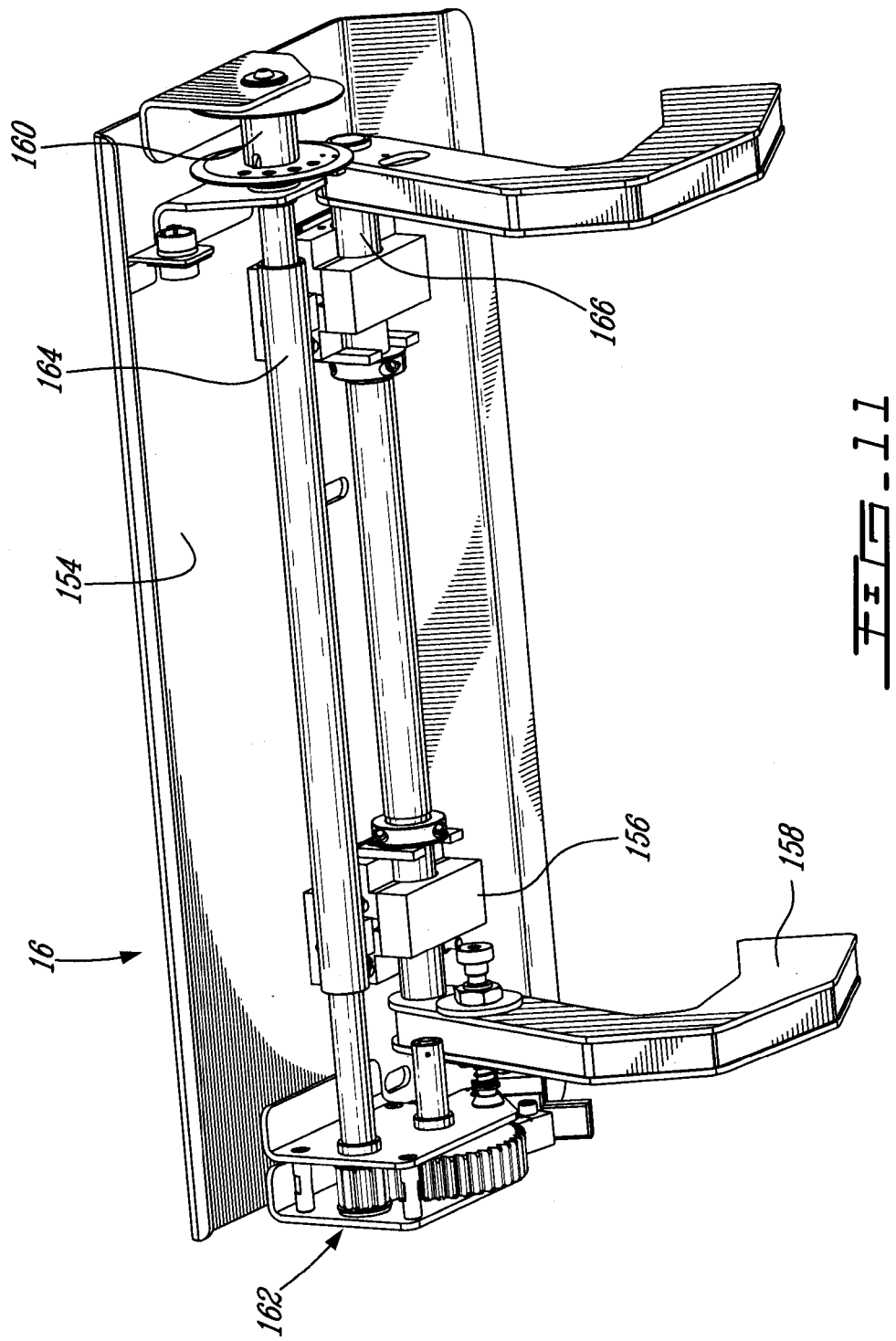
FIG. 11 is a perspective view of a header assembly of the evacuation device of FIG. 1.

Referring to FIG. 11, the header assembly 16 comprises a header plate 154 defining a top portion of the frame module 88, door mounting blocks 156 and door hinges 158. The header assembly 16 also comprises a rope drum 160 and a winch assembly 162 linked together by a drive shaft 164. The header assembly 16 is fixed to the vehicle and to a remainder of the frame module 88, for example with fasteners.

The door hinges 158 are attached to the mounting blocks 156 with shafts 166, with the mounting blocks 156 being attached directly to the header plate 154. In a particular embodiment, the height of the door 20 can be adjusted by the addition or removal of shims (not shown) between the blocks 156 and the header plate 154. In the embodiment shown, the mounting blocks 156 are adjustable from front to rear, and the height of the door 20 is adjusted by the addition or removal of shims between the blocks 156 and the header plate 154.

The rope drum 160 is rotationally mounted on the header plate 154, such as to be rotationally mounted in a fixed position with respect to the frame module 88. A rope 168 (see FIG. 1) is provided on one side of the ramp 90 for the stowing of the ramp 90. The rope 168 is attached to the rope drum 160, passes around the front end of the ramp 90 and is attached under the ramp 90 under the primary side member 98 near the hinged connection with the secondary side member 100. The rope 168 under tension retains the ramp 90 passed the vertical position when the ramp is in the folded position. The rope 168 also allows the deployed ramp 90 to be folded.

Referring to FIGS. 11-12, the winch assembly 162 includes a gear 170 functionally linked to the rope drum 160 through the drive shaft 164 such as to rotate simultaneously therewith. A ratchet mechanism 172 is biased, e.g. through a spring 174, in an engaged position in engagement with the gear 170. The ratchet mechanism 172 in the engaged position prevents the gear 170, and as such the winch assembly 162 and rope drum 160, from rotating in the direction causing deployment of the ramp 90, while allowing the gear 170, and as such the winch assembly 162 and rope drum 160, to rotate in the opposed direction for retracting the ramp 90.

Figure 15A:
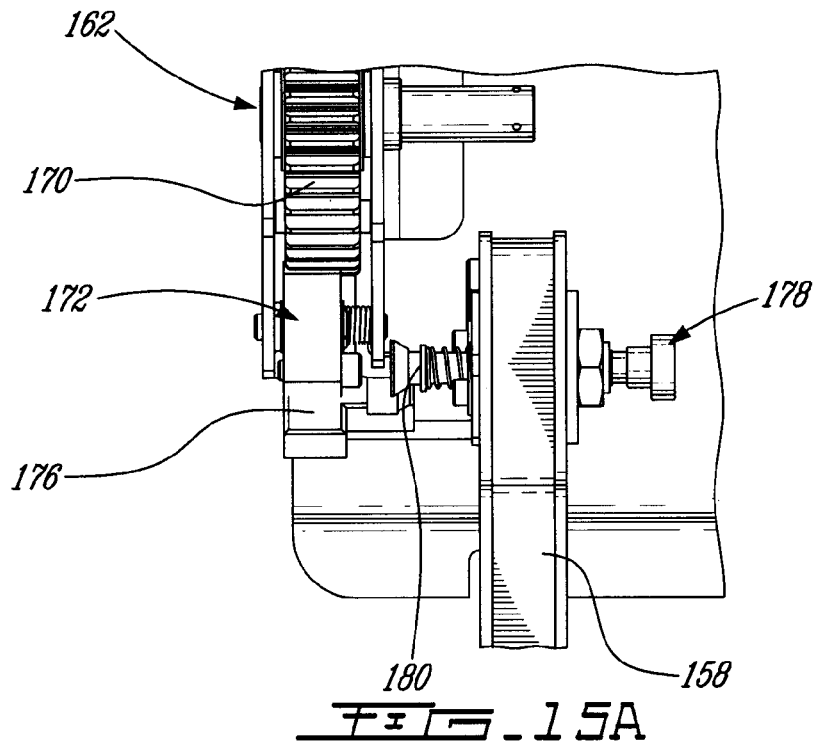
FIGS. 15A-15B are partial front views of the header assembly of FIG. 11, showing the engagement and retraction of latch mechanism thereof with the ratchet mechanism of FIG. 12.

The ratchet mechanism 172 is pivotable between the engaged position and a release position free of the gear 170. Referring to FIGS. 12 and 15A, the ratchet mechanism 172 includes a release plate 176, and the adjacent door hinge 158 includes a latch, mechanism 178 with a slidable finger 180 in contact with the release plate 176. When the door opens, the finger 180 pushes against the release plate 176, moving the ratchet mechanism 172 away from the engaged position with the gear 170 of the winch assembly 162. The release plate 176 is sized and positioned such that at a given position along the opening path of the door 20, the finger 180 pushes the ratchet mechanism 172 in the release position where the ratchet mechanism 172 is disengaged from the gear 170 of the winch assembly 162. The given position preferably corresponds to the fully opened position of the door 20 or to a position close thereto. The deployment of the ramp 90 is thus prevented until the door reaches that given position.

In an alternate embodiment which is not shown, the finger 180 of the latch mechanism 178 can be provided attached to any adequate element of the door assembly 12.

Figure 15B:
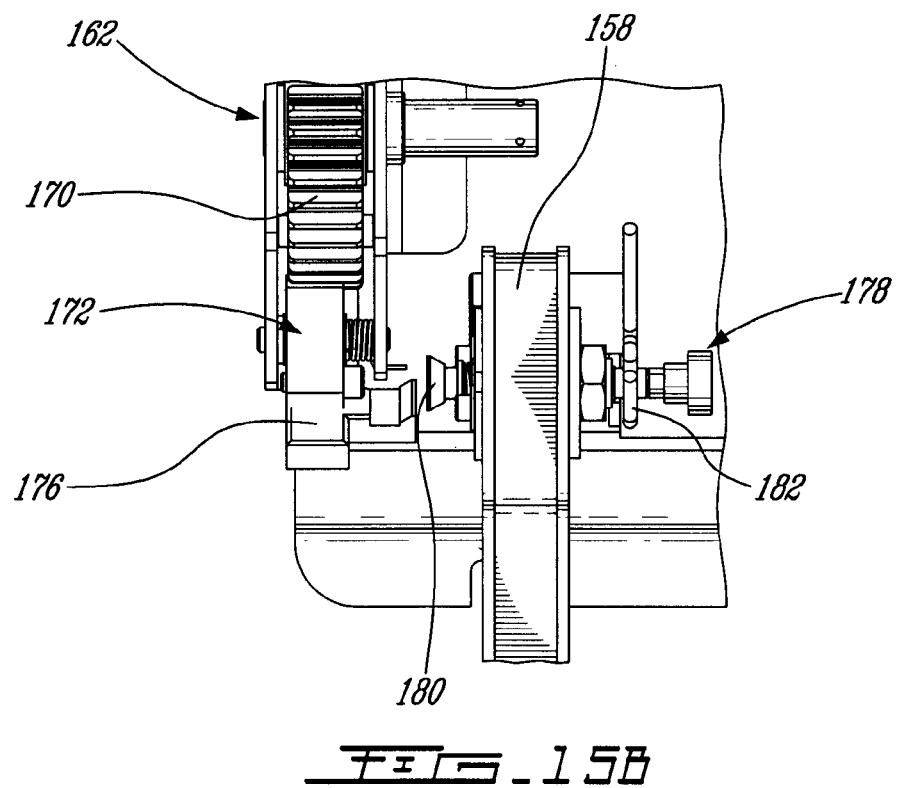

Once the deployed ramp 90 needs to be folded, the finger 180 is pulled so as to disengage it from the release plate 176, as shown in FIG. 15B, such that the spring 174 brings the ratchet mechanism 172 back in engagement with the gear 170 of the winch assembly 162. The winch assembly 162 is activated manually from the cab interior using a winch crank, which rotates the rope drum 160 through the drive shaft 164 and thus pulls the ramp 90 with the rope up to the folded position. The winch crank is preferably provided with a torque limiter to avoid causing damage and/or compromising the next deployment due to overtorquing. In a particular embodiment, the winch assembly 162 allows the ramp stowing in less than 5 minutes by a trained person.

The evacuation device 10 is thus used according to the following.

When evacuation is required, the locking mechanism 34 is disengaged, either by pivoting the cover 86 and pressing the release bar 84 of the interior release mechanism 36 (see FIG. 3), by breaking the frangible cover (if applicable) and pulling the handle of the exterior release mechanism 142, or by opening the access panel 72 of the door assembly 12 and turning the handle 74 of the cam 44 (see FIGS. 5A-5B). In all cases, the cam 44 rotates and the locking mechanism 34 disengages the door 20 from the frame module 88 after the pressure has been released from the inflatable seal 26.

Once the locking mechanism 34 is disengaged, the door 20 opens automatically, under the action of the gas springs 32. The close switch 80 is activated by the opening of the door 20, and the floodlight 82 is turned on. Once the door 20 is fully opened at least one of the gas springs 32 preferably locks to prevent the door 20 from falling down.

Once the door 20 has reached the given position allowing the ratchet mechanism 172 to be released, which is preferably the nearly opened or fully opened position (see FIG. 13A), the finger 180 of the latch mechanism 178 (see FIGS. 15A-15B) pivots the ratchet mechanism 172 to the release position free from the gear 170 of the winch assembly 162, thus releasing the tension in the rope 168.

Figure 13B:
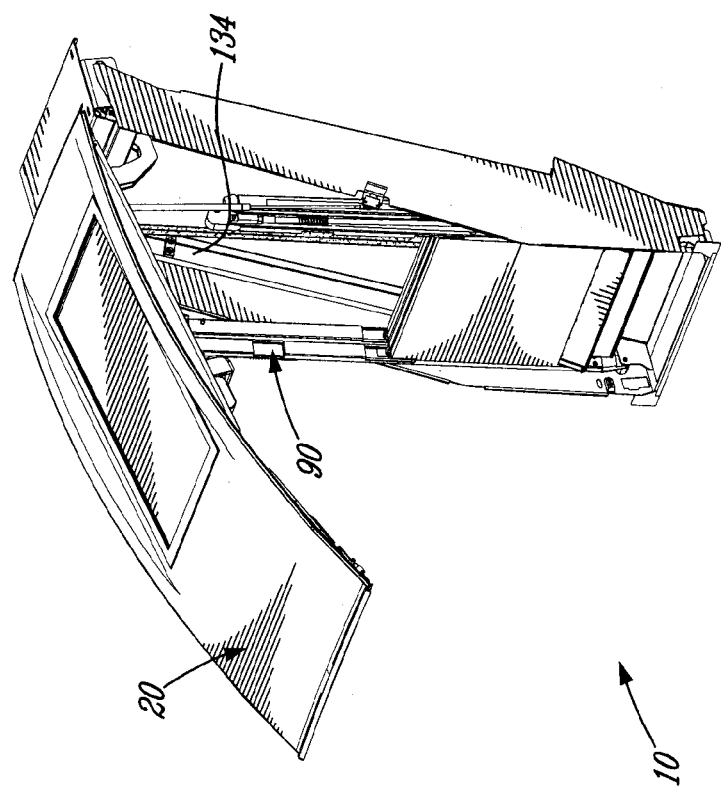
Figure 13A:
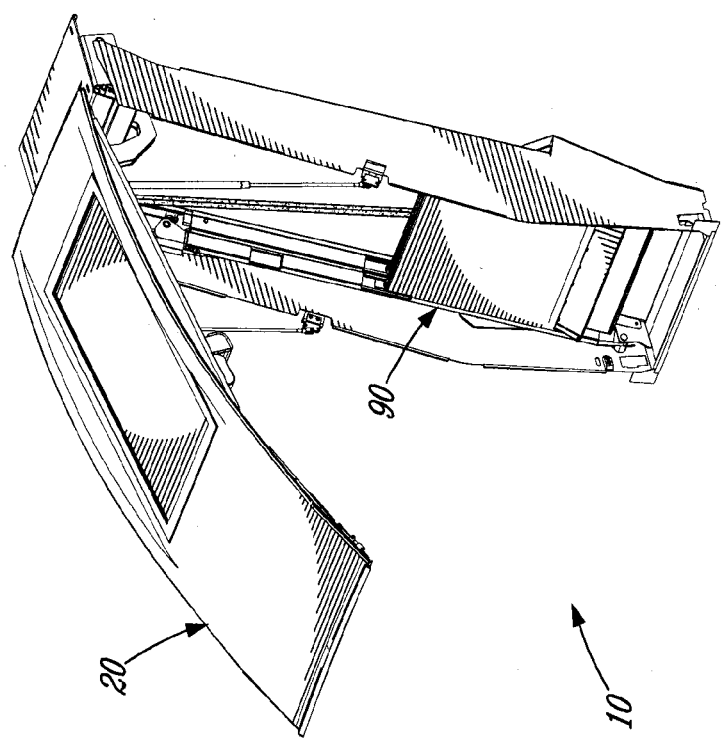
Figure 13F:
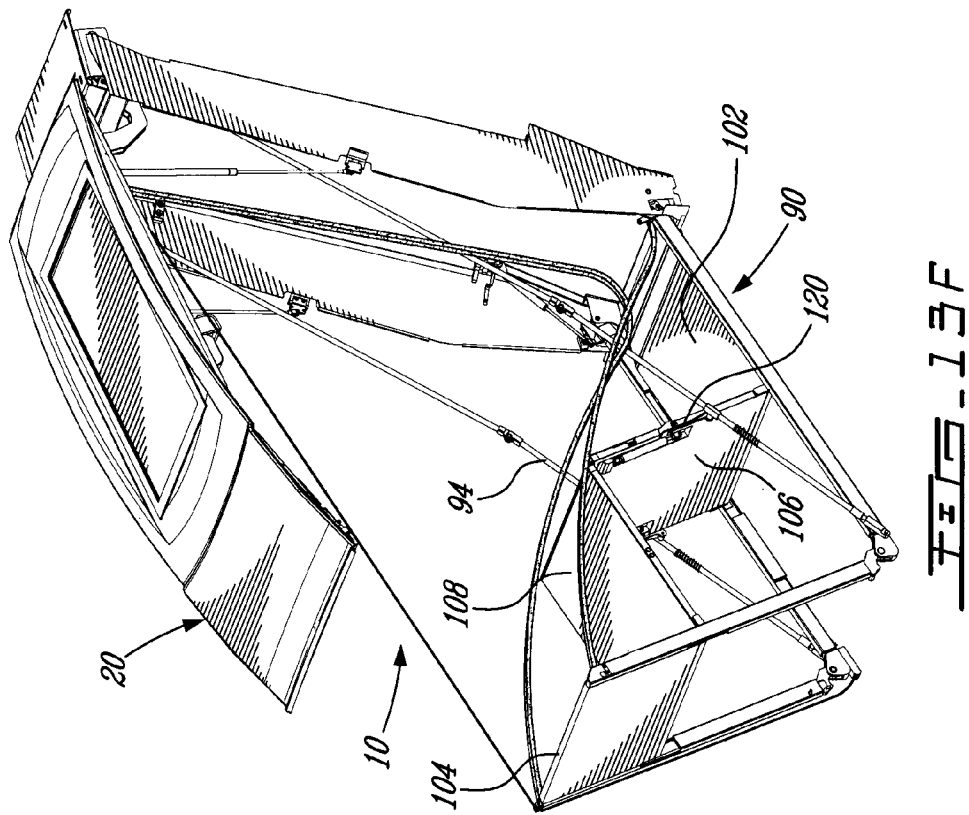
Figure 13E:
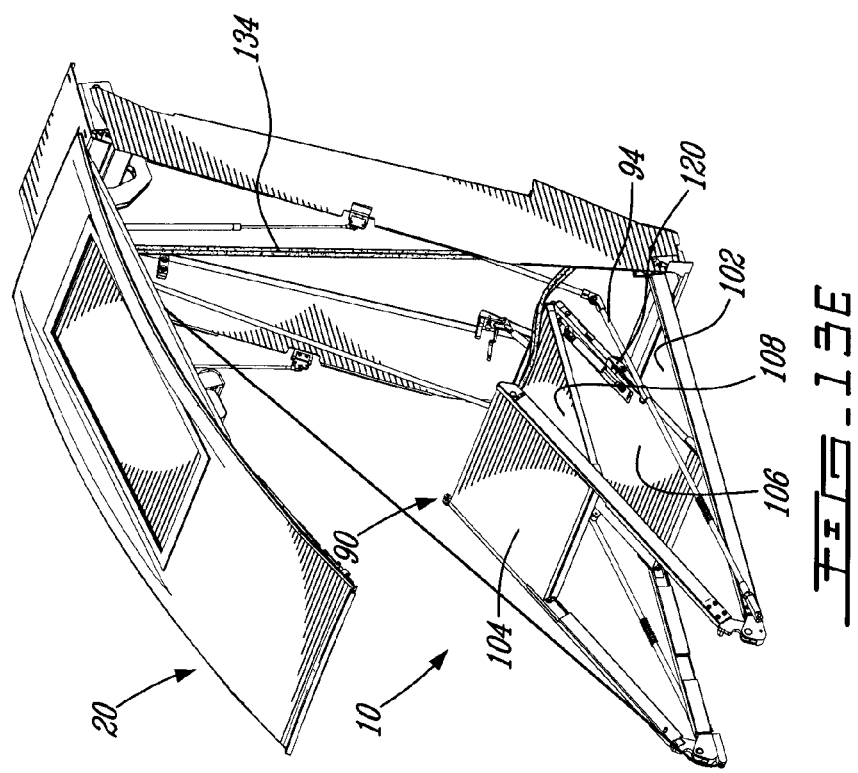

The spring-loaded arms 136 of the ramp 90, which were engaged with the springs 140 during the previous folding of the ramp 90 (see FIG. 9), push the ramp 90 up to and over the vertical position, as shown in FIGS. 13B-13C, thus causing the automatic deployment of the ramp 90. The motion of the ramp 90 is not restricted by the belts 134 which extend loosely at this point.

The continued deployment of the ramp 90 is illustrated in FIGS. 13D-13G. The ramp 90 deploys under the action of gravity, with the motion being controlled by the primary and secondary dampers 92, 114. During the deployment, the ramp linkages 94 push on the primary flipping panel 106 through the arms 120 to initiate the deployment of the secondary ramp panels 104, 108 (see particularly FIG. 13E). The movement of the secondary ramp panels 104, 108 is then stopped by the hinged connection between the primary and secondary side members 98, 100. The ramp deployment is stopped (See FIG. 13H) by the ramp linkages 94 and the interaction between the sleeves 118 through which the linkages 94 extend and the compression springs 122.

During the deployment of the ramp 90, the flipping panels 106, 108 cover the opening which was overlaying the windshield area 18 of the door 20 when the ramp 90 was in the folded position, such as to complete the ramp walkway surface. The flipping panels 106, 108 rest against the stoppers 112 extending from the side members 98, 100.

A single operation, namely the unlocking of the locking mechanism 34, is thus necessary to cause the complete opening of the door 20 and deployment of the ramp 90. In a particular embodiment, the ramp deployment is completed in less then one (1) minute.

The passengers are then evacuated, with the flipping panel lock 124 being activated by the weight of the first person walking on the ramp 90.

The deployed ramp 90 is folded and stowed in its folded position, ready for the next use, according to the following. The flipping panel lock 124 is manually unlocked through the lever 128 provided under the ramp 90 (see FIG. 7). The gripping mechanism 130, also shown in FIG. 7, is engaged to the hinged connection 110 between the flipping panels 106, 108, as illustrated in FIG. 14.

Referring to FIGS. 15A-15B, the finger 180 of the latch mechanism 178 is pulled and a safety locking pin 182 is inserted in an opening of the finger 180 to maintain its position. As such, the spring 174 brings the ratchet mechanism 172 back in engagement with the gear 170 of the winch assembly 162.

The winch crank is engaged with the winch assembly 162 and operated. In a particular embodiment, the winch crank is provided with a mechanism, for example a small retractable plunger engaging a corresponding hole in the winch assembly 162, preventing the winch crank from accidentally disengaging from the winch assembly 162 during its operation.

The winch assembly 162 is manually operated by pulling and pushing on the winch crank as per a standard ratchet tool. The winch assembly 162 winds the rope 168 around the rope drum 160, pulling on the ramp 90 through the rope 168 and automatically folding the ramp linkages 94. The linkages 94 and interconnection between the ramp panels 102, 104, 106, 108 allow the ramp 90 to fold in a manner corresponding to the reverse sequence of the deployment process up to the fully folded position. The winch crank is then disengaged from the winch assembly 162, if necessary by pushing on the plunger retaining it thereto with a release tool which in a particular embodiment is removably provided, e.g. screwed, on the opposed end of the winch crank.

The ratchet mechanism 172 engaged to the winch assembly 162 prevents the ramp 90 from falling back to the deployed position. The gas springs 32 are unlocked to allow the door 20 to close. The door 20 is closed from the inside of the vehicle simply by pulling on the release bar 84 by hand, until the door 20 reaches its closed position, and the locking mechanism 34 is engaged. The closing of the door 20 activates the close and lock switches 80, 62, and once the close switch 80 is activated, the floodlight 82 turns off. As the locking mechanism 34 is engaged, the rotating cam 44 disengages from the pneumatic valve 64 and as such allows the inflatable seal 26 to be re-pressurized.

The finger 180 of the latch mechanism 178 is repositioned in engagement with the release plate 176 of the ratchet mechanism 172 after removal of the safety locking pin 182, and the cover 86 of the release bar 84 is reset if the interior release mechanism 36 was used to open the door 20. In a case where the exterior release mechanism 142 was used to open the door and a frangible cover was broken, such frangible cover is preferably replaced.

Advantageously, under condition where low electrical supply or no electrical power is available, the evacuation device 10 stays fully functional and can be operated at anytime.

The embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

The invention claimed is:

1. A foldable ramp for evacuation of a vehicle, the ramp comprising:
    a first pair of spaced apart primary side members each having a first end hingedly connectable to a frame attached to the vehicle and a second end opposed the first end;
    a second pair of spaced apart secondary side members, each of the secondary side members having opposed first and second ends, the second end of each secondary side member being connected to the second end of a respective one of the primary side members;
    a primary flipping panel extending between the primary side members and having a first end pivotally connected to the primary side members and a second end displaceable relative to the side members;
    a secondary flipping panel extending between the secondary side members and having a first end pivotally connected to the secondary side members and a second end displaceable relative to the side members, the second end of the secondary flipping panel being hingedly connected to the second end of the primary flipping panel; and
    a fixed panel extending between the side members of one of the first and second pairs, the fixed panel being fixedly attached to the side members of the one of the first and second pairs adjacent the first ends thereof, the fixed panel being adjacent the first end of the flipping panel connected to the side members of the one of the first and second pairs;
    wherein the ramp is configurable between a folded and a deployed position, the panels in the deployed position forming a ramp surface for evacuation of the vehicle, and the panels in the folded position being stacked one against the other.

2. The ramp as defined in claim 1, further comprising two ramp linkages each including two hingedly interconnected sections, each ramp linkage extending from a respective one of the primary side members near the second end thereof for connection to the frame, and further comprising at least one arm pivotally connected to a respective side of the primary flipping panel such that upon deployment of the ramp, each arm is actuated by a respective one of the ramp linkages to force a deployment of the primary flipping panel.

3. The foldable ramp as defined in claim 2, wherein the at least one arm includes two arms, each linkage slidably extending through a sleeve pivotally connected to a respective one of the arms.

4. The foldable ramp as defined in claim 1, wherein the fixed panel is integral with the side members of the one of the first and second pairs.

5. The foldable ramp as defined in claim 1, wherein the fixed panel is a primary fixed panel and the one of the first and second pairs is the first pair, further comprising a secondary fixed panel extending between the secondary side members adjacent the first ends thereof and adjacent the first end of the secondary flipping panel, the secondary fixed panel being fixedly attached to the secondary side members.

6. The foldable ramp as defined in claim 1, wherein a hinged connection between the primary and secondary side members is aligned with a hinged connection between the primary and secondary flipping panels.

7. The foldable ramp as defined in claim 1, wherein the primary and secondary flipping panels are interconnected by at least one damper.

8. The foldable ramp as defined in claim 1, further comprising a lock engageable to lock a position of the primary and secondary flipping panels relative to one another, the lock being automatically engaged when the flipping panels become aligned with one another.

9. The foldable ramp as defined in claim 8, wherein the primary and secondary flipping panels are biased away from a position aligned with one another, so that a force must be applied to align the flipping panels to engage the lock.

10. The foldable ramp as defined in claim 3, further comprising a lock engageable to lock a position of the primary and secondary flipping panels relative to one another, the lock being automatically engaged when the flipping panels become aligned with one another, wherein the primary and secondary flipping panels are biased away from a position aligned with one another by a spring surrounding each linkage and compressed between the sleeve and an end of the linkage connected to the primary flipping panel, so that a force must be applied to align the flipping panels to engage the lock.

11. The foldable ramp as defined in claim 1, wherein the primary and secondary side members include stoppers extending therefrom against which the primary and secondary flipping panels abut when aligned with one another.

12. An evacuation device for a ground vehicle, the evacuation device comprising a ramp as defined in claim 1, the frame defining a door opening, a door connected to the frame through hinges such as to be pivotable between a closed position where the door blocks the door opening and an opened position where a free end of the door is pivoted away from the vehicle, the ramp in the folded position allowing the door to close thereover.

13. The device as defined in claim 12, further comprising flexible belts extending between the secondary side members and the frame to serve as handrails for users of the device.

14. The device as defined in claim 12, wherein the ramp is biased toward the deployed position when in the folded position, the device further comprising a drum rotationally mounted in a fixed position with respect to the frame and a rope extending between the ramp and the drum and wound therearound, a gear functionally linked to the drum such as to rotate simultaneously therewith, a ratchet mechanism biased in an engaged position in engagement with the gear and movable to a release position free of the gear, the ratchet mechanism in the engaged position allowing the gear to rotate in a first direction and preventing the gear from rotating in a second direction, the drum rotating to pull the ramp toward the folded position when the gear rotates in the first direction.

15. The device as defined in claim 14, further comprising a latch mechanism attached to the door, the latch mechanism engaging the ratchet mechanism and moving the ratchet mechanism toward the release position as the door opens.

16. The device as defined in claim 15, wherein the latch mechanism moves the ratchet mechanism to the release position only when the door reaches the opened position, such that the ramp is prevented from being deployed until the door reaches the opened position.

17. The device as defined in claim 12, wherein the door includes a locking mechanism locking the door with the frame and actuable to unlock the door from the frame, the door further including an inflatable seal extending therearound and sealing a space between the door and the frame when the door is in the closed position, the inflatable seal being connected to a source of pressurized air through a valve actuable to release air pressure in the inflatable seal, and wherein the valve is functionally connected to the locking mechanism such that actuation of the locking mechanism actuates the valve before actuating the latch.

* * * * *